United States Patent
Tsujimoto et al.

(10) Patent No.: US 6,449,123 B1
(45) Date of Patent: Sep. 10, 2002

(54) METHODS FOR MARKING A SINTERED PRODUCT AND FOR FABRICATING MAGNETIC HEAD SUBSTRATE

(75) Inventors: Shinji Tsujimoto, Ibaraki (JP); Takayuki Morikawa, Kadoma (JP)

(73) Assignee: Sumitomo Special Metals Co., Ltd. (JP)

( * ) Notice: Subject to any disclaimer, the term of this patent is extended or adjusted under 35 U.S.C. 154(b) by 152 days.

(21) Appl. No.: 09/621,813

(22) Filed: Jul. 21, 2000

(30) Foreign Application Priority Data

Aug. 16, 1999 (JP) .......................... 11-265946
Mar. 21, 2000 (JP) ........................ 2000-078033

(51) Int. Cl.⁷ .................................. G11B 5/147
(52) U.S. Cl. ............ 360/126; 360/234.3; 29/603.12; 29/603.15; 216/22; 216/66; 216/99; 216/102; 219/121.68
(58) Field of Search ............... 216/22, 99, 102, 216/66; 219/162, 121.69, 121.68; 29/603.12, 603.15, 603.16; 360/234.3, 126

(56) References Cited

U.S. PATENT DOCUMENTS

| 5,516,430 A | 5/1996 | Hussinger |
| 5,764,454 A | 6/1998 | Hishida |
| 5,837,963 A | * 11/1998 | Kitahara ................ 219/121.69 |
| 6,202,289 B1 | * 3/2001 | Yoshimura et al. ...... 29/603.12 |

FOREIGN PATENT DOCUMENTS

| JP | 9-81922 | 3/1997 |
| JP | 10-134317 | 5/1998 |
| JP | 11-126311 | 5/1999 |

* cited by examiner

Primary Examiner—Robert S. Tupper
(74) Attorney, Agent, or Firm—Nixon Peabody LLP; Jeffrey L. Costellia

(57) ABSTRACT

A marking method for a sintered product of the invention includes forming a concave portion on the sintered product by irradiating the sintered product with laser light thereby to write identification information on the sintered product. The depth of the concave portion is adjusted in a range between 0.1 µm and 5 µm, inclusive.

19 Claims, 9 Drawing Sheets

METHODS FOR MARKING A SINTERED PRODUCT AND FOR FABRICATING MAGNETIC HEAD SUBSTRATE

BACKGROUND OF THE INVENTION

The present invention relates to a method for marking a sintered product with identification information while minimizing the generation of contamination. The present invention also relates to a method for fabricating a substrate for a magnetic head including the marking step, a sintered product with identification information marked thereon, a magnetic head, and a storage medium drive.

In recent years, thin film magnetic heads of various constructions have been used as magnetic head sliders for hard disk drives (HDD), tape storages, floppy disk drives (FDD), and the like. Sintered substrates, made of compositions such as $Al_2O_3$—TiC, SiC, and $ZrO_2$, are used for such thin film magnetic heads.

FIG. 1A illustrates a typical thin film magnetic head slider 10. The magnetic head slider 10 has two side rails 11 on the track side thereof facing the surface of a magnetic disk. The surface of the magnetic head slider 10 where the side rails 11 are formed is sometimes called an air bearing surface (ABS). When the magnetic disk is rotated at high speed with a motor or the like, in the state where the side rails 11 of the magnetic head slider 10 lightly press the surface of the magnetic disk under head suspension, a layer of air formed on the surface of the magnetic disk intrudes into a gap under the air bearing surface of the slider 10. This causes the magnetic head slider 10 to be slightly lifted. In this way, the magnetic head slider 10 hovers near the surface of the magnetic disk, to effect recording/reproducing operation.

Thin films 12 are formed on one end face of the magnetic head slider 10 for magnetic interaction with a storage medium such as the magnetic disk. The thin films 12 constitute an electric/magnetic transducer element. On the other end face of the magnetic head slider 10, identification information 13, such as a serial number, is engraved. Methods for engraving the identification information 13 on the sintered substrate are disclosed in Japanese Laid-Open Patent Publication No. 9-81922, No. 10-134317, and No. 11-126311, for example.

The magnetic head slider 10 is obtained in the following manner. A bar 20 as shown in FIG. 1B is cut from a sintered substrate 1 as shown in FIG. 1C, and the bar 20 is divided into a plurality of chips. The positional relationship between the sintered substrate 1 shown in FIG. 1C and the magnetic head slider 10 shown in FIG. 1A is such that an end face 4 of the sintered substrate 1 is parallel with the air bearing surface of the magnetic head slider 10.

As the size of thin film magnetic heads 12 is reduced to cope with the reduction in size and weight of electronic apparatuses, the thickness of the sintered substrate 1 (corresponding to the length L of the magnetic head slider 10) is reduced, and the thickness T of the bar 20 (corresponding to the height of the magnetic head slider 10) is reduced. For example, in a magnetic head slider called a pico-slider, L is about 1.2 mm and T is about 0.3 mm. With such a short magnetic head slider, the size of characters to be engraved thereon should also be made smaller.

A laser marking method is commonly used for engraving (hereinafter, also called "inscription" and "marking") of the identification information 13. According to the laser marking method, the identification information 13 shown in FIGS. 1A and 1B is inscribed on the back surface 3 of the substrate 1 in the wafer state before being divided into the bars 20. Subsequently, various thin films 12 are formed on the opposite surface 2 of the substrate 1.

The conventional laser marking method will be described with reference to FIG. 2. The back surface 3 of the sintered substrate 1 is irradiated with a laser beam 6 converged by a lens 5. An irradiated portion of the substrate 1 is rapidly heated and evaporated, so that a small concave portion or recessed portion is formed on the back surface 3 of the substrate 1. At this time, pieces of the sintered material constituting the substrate 1 scatter. Some of these pieces fall back on the substrate 1. By scanning the back surface 3 of the substrate 1 with the laser beam 6, an arbitrary recess pattern can be formed. Thus, by forming a pattern of alphabets, numerals, barcodes, and the like, various types of identification information can be written at arbitrary positions on the substrate 1.

There are problems associated with the conventional laser marking method. First, debris is generated by the laser light irradiation. This debris often causes contamination in later fabrication process steps, by becoming absorbed and accumulated in inscribed grooves and the like. Second, burrs are generated at edges of the grooves during the laser light irradiation. Therefore, an additional step for removing such burrs is required.

FIG. 3A schematically illustrates the cross-section of the sintered substrate 1 after the substrate 1 has been engraved by the conventional laser marking method. This cross-sectional view was drawn based on a photograph taken with a scanning electron microscope (SEM). Referring to FIG. 3A, a deep concave portion 30 is formed on the surface of the substrate 1 by irradiation with laser light. The depth of the concave portion 30, measured from the back surface of the substrate 1 in the direction shown by the arrow a, is 30 to 50 μm. A convex portion (burr) 31 is formed along the edge of the concave portion 30. The height of the burr 31 measured in the direction shown by the arrow b is of the order of several micrometers. The width of the concave portion 30 is of the order of 20 μm, for example. Hereinafter, the depth of the concave portion is referred to as the "inscription depth", and the height of the raised portion around the concave portion is referred to as the "edge burr height".

A number of particles 32 attach to the wall of the deep concave portion 30 formed by the laser light irradiation. The particles 32 are not necessarily in the form of particles, but are herein called "particles" for simplification. In order to remove the particles 32 from the substrate 1, a long-duration cleaning step, such as ultrasonic cleaning, is required after the marking step. Even by this cleaning step, however, it is difficult to remove the particles 32 located deep inside the concave portion 30 to a sufficient degree.

If a large number of particles 32 are generated during the laser marking step, part of the particles 32 may be dispersed in a cleaning Solution, and part of the particles 32 in the cleaning solution may possibly re-attach to the surface of the substrate 1 that has not been irradiated with laser light (surface 2). If this re-attachment occurs and an insulating thin film made of amorphous aluminum oxide or the like is deposited on the surface 2 of the substrate 1, the particles 32 may be included in the insulating thin film. The surface of the insulating thin film is smoothed before a magnetic thin film is deposited thereon. Therefore, if the particles 32 exist in the insulating thin film, the insulating thin film may be locally peeled off together with the particles 32, resulting in formation of pinholes in the insulating thin film. Even if formation of pinholes is evaded, the insulating thin film may be substantially thinned in some portions due to the existence of the particles 32. The insulating property of such portions of the insulating thin film is decreased. Such inclusion of the particles in the insulating thin film does not necessarily occur. However, as long as the inscribed portions of the back surface of the substrate serve as a dust source, the yield may be lowered in the subsequent steps, and also the reliability of the final products may be decreased.

In order to improve the production yield of thin film magnetic heads, the quality of the insulating film deposited on the sintered substrate 1 should preferably be improved as much as possible. In order to achieve this, the marking step that is a cause of generation of dust or contamination should desirably be improved to minimize generation of dust. In addition, the resultant magnetic head as a complete component should not generate dust. Since the magnetic head is used in a clean environment, generation of dust will cause a problem.

A method for replacing the above laser marking method has also been proposed, where identification information is written on a sintered substrate by chemical etching. However, by this chemical etching method, also, particles enter a concave portion (groove) formed on the substrate surface if the concave portion is deep, resulting in generation of dust or contamination.

An object of the present invention is to provide a marking method for a sintered product that can reduce the generation of dust and minimize the formation of burrs.

Another object of the present invention is to provide methods for fabricating with high yield a sintered product, a magnetic head substrate, a magnetic head, and a storage medium drive with high quality by executing an inscribing step according to the above marking method.

SUMMARY OF THE INVENTION

The marking method for a sintered product of the present invention includes forming a concave portion on the sintered product by irradiating the sintered product with laser light to write identification information on the sintered product, wherein the depth of the concave portion is in a range between 1 $\mu$m and 5 $\mu$m, inclusive.

The method for fabricating a magnetic head substrate of the present invention includes the steps of: (1) writing identification information on a first surface of the magnetic head substrate by the above marking method for a sintered product; and (2) subjecting the magnetic head substrate to ultrasonic cleaning.

In a preferred embodiment, the method further includes the step of forming a thin film on a second surface of the magnetic head substrate after the step of subjecting the substrate to ultrasonic cleaning.

The magnetic head substrate of the present invention is marked with identification information by laser light irradiation, wherein the identification information is constructed of a concave portion having a depth in a range between 0.1 $\mu$m and 5 $\mu$m, inclusive.

The magnetic head of the present invention is marked with identification information by laser light irradiation, wherein the identification information is constructed of a concave portion having a depth in a range between 0.1 $\mu$m and 5 $\mu$m, inclusive.

Alternatively, the marking method for a sintered product of the present invention includes the steps of: (1) preparing a sintered product formed of a powder mixture including first powder particles of a first material and second powder particles of a second material having an etching characteristic different from the etching characteristic of the first material; and (2) performing selective etching for a selected portion of a surface of the sintered product, the selective etching including etching the first powder particles with priority over the second power particles, thereby to write identification information on the surface of the sintered product.

In a preferred embodiment, the mean grain diameters of the first powder particles and the second powder particles are in a range between 0.3 $\mu$m and 5.0 $\mu$m, inclusive.

Preferably, the difference in reflectance between the portion of the surface of the sintered product that has been subjected to the selective etching and a portion that has not been subjected to the selective etching is 15% or more for light having a certain wavelength.

The wavelength is preferably included in a wavelength range for light used for irradiating the sintered product for optically reading the identification information.

Preferably, the plane roughness of the portion of the surface of the sintered product that has not been subjected to the selective etching is 5 nm or less.

Preferably, the mean etching depth of the portion of the surface of the sintered product that has been subjected to the selective etching is in a range between 5 nm and 200 nm, inclusive.

The first material and the second material are preferably compounds selected from the group consisting of aluminum oxide, aluminum nitride, silicon oxide, silicon nitride, zirconium oxide, zirconium nitride, silicon carbide, titanium carbide, titanium oxide, and iron oxide.

Alternatively, the method for fabricating a magnetic head substrate of the present invention includes writing identification information on the sintered product by the above marking method for a sintered product.

The method for fabricating a magnetic head of the present invention includes fabricating a magnetic head, provided with the identification information from the magnetic head substrate fabricated by the above method, for fabricating a magnetic head substrate.

The sintered product of the present invention is formed of a powder mixture including first powder particles of a first material and second powder particles of a second material having an etching characteristic different from an etching characteristic of the first material, wherein the first powder particles are selectively etched with priority over the second power particles in a selected portion of a surface of the sintered product, to write identification information on the surface of the sintered product.

In a preferred embodiment, the mean grain diameters of the first powder particles and the second powder particles are in a range between 0.3 $\mu$m and 5.0 $\mu$m, inclusive.

Preferably, the difference in reflectance between the portion of the surface of the sintered product that has been etched and a portion that has not been etched is 15% or more for light having a certain wavelength.

The wavelength is preferably included in a wavelength range for light used for irradiating the sintered product for optically reading the identification information.

Preferably, the plane roughness of the portion of the surface of the sintered product that has not been etched is 5 nm or less.

Preferably, the mean etching depth of the portion of the surface of the sintered product that has been etched is in a range of 5 nm and 200 nm, inclusive.

The first material and the second material are preferably compounds selected from the group consisting of aluminum oxide, aluminum nitride, silicon oxide, silicon nitride, zirconium oxide, zirconium nitride, silicon carbide, titanium carbide, titanium oxide, and iron oxide.

Alternatively, the magnetic head substrate of the present invention is formed of the above sintered product.

Alternatively, the magnetic head of the present invention includes: the above magnetic head substrate; and an electric/magnetic transducer element formed on the magnetic head substrate.

The storage medium drive of the present invention includes: the above magnetic head; a storage medium having a magnetic recording film on/from which information is recorded/reproduced via the magnetic head; and a motor for driving the storage medium.

BRIEF DESCRIPTION OF THE SEVERAL VIEWS OF THE DRAWINGS

The foregoing summary, as well as the following detailed description of the preferred embodiments of the invention, will be better understood when read in conjunction with the appended drawings. For the purpose of illustrating the invention, there is shown in the drawings an embodiment that is presently preferred. It should be understood, however, that the invention is not limited to the precise arrangements and instrumentalities shown. In the drawings.

DETAILED DESCRIPTION OF THE INVENTION

Hereinafter, preferred embodiments of the present invention will be described with reference to the accompanying drawings.

Embodiment 1
Marking Method for Sintered Product

First, a sintered substrate produced by a conventional method is prepared. The material and composition of the sintered product used for applying the present invention can be arbitrarily selected.

Figure 2:
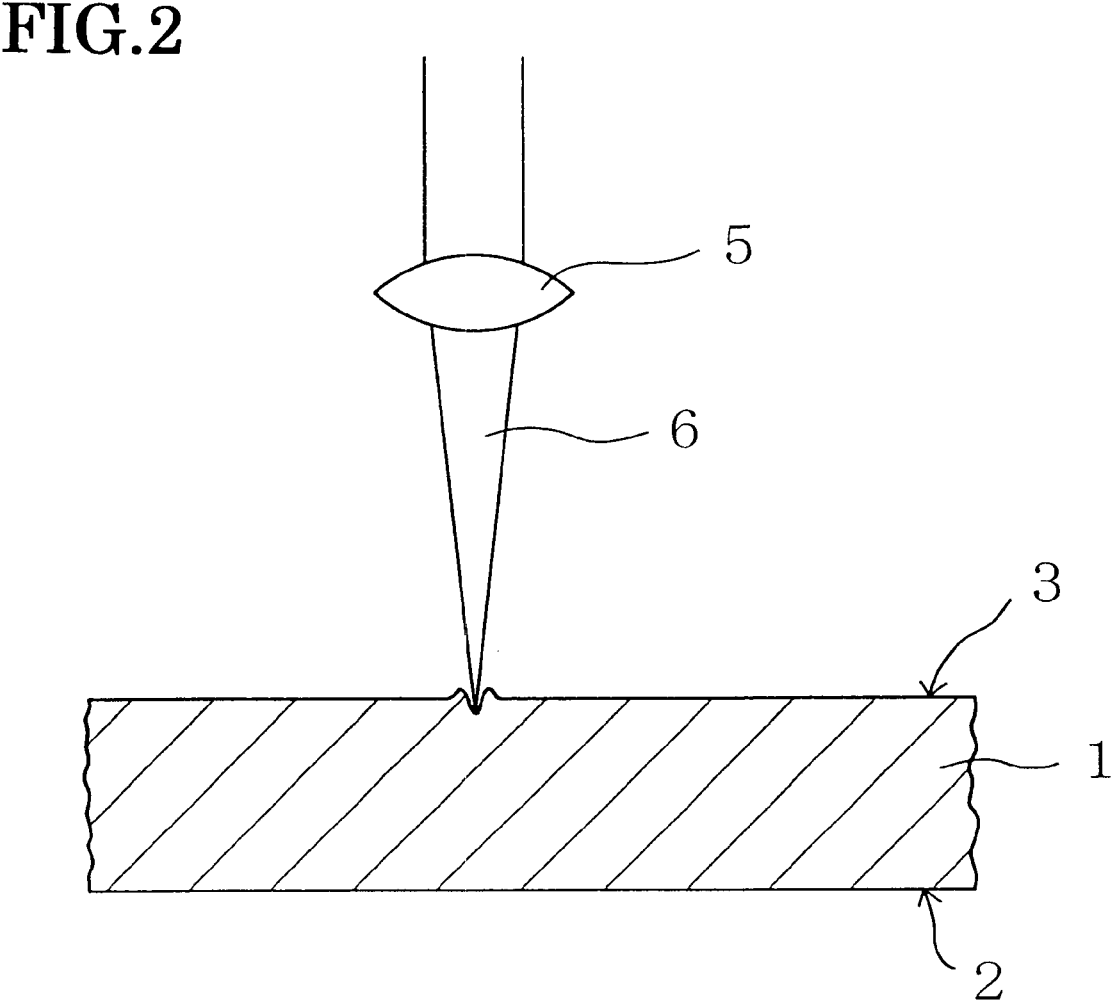
FIG. 2 is a schematic view illustrating the laser marking step.

The sintered product is irradiated with laser light in the manner shown in FIG. 2, to form a concave portion or recessed portion on the sintered substrate. In this step, the substrate surface is scanned with laser light by driving a support mechanism that holds an optical system of a laser irradiation device (laser marker) or the substrate in X-Y directions with high precision. During the scanning, the beam spot of the laser light moves on the substrate surface according to a program pre-stored in a memory of a computer or the like, thereby forming concave portions of a given pattern on the substrate surface. In this way, visually recognizable identification information is written on the sintered product.

As a laser light source, a gas laser such as a $CO_2$ laser and a YAG laser is preferably used in consideration of the power. The wavelength of the irradiated laser light may preferably be in such a wavelength range, that laser light having a wavelength in this range can be efficiently absorbed into the sintered product and rapidly heat the sintered product.

The optical system of the laser is designed so that the beam spot diameter of the laser light on the surface of the sintered product is roughly as large as the wavelength of the laser light. Although varying depending on the size of a code or character to be inscribed, the width of the concave portion actually formed is of the order of several micrometers, which is larger than the beam spot diameter of the laser light. This is due to the fact that, when the sintered body is irradiated with the laser light, not only the irradiated portion, but also the surrounding portions, are heated and scattered, resulting in formation of a relatively widened concave portion.

According to the present invention, the depth of the thus-formed concave portion is adjusted in the range between 0.1 $\mu$m and 5 $\mu$m, inclusive. This adjustment of the depth of the concave portion is realized by controlling the power of the laser light. Substantially the same effect may also be obtained by controlling the speed of scanning of the laser light. However, controlling the power of the laser light is preferable if high-precision control is desired. The reason why the depth of the concave portion should preferably be adjusted in the range between 0.1 $\mu$m and 5.0 $\mu$m, inclusive, will be described hereinafter in detail.

Method for Fabricating Magnetic Head Substrate

An embodiment of the method for fabricating a magnetic head substrate of the present invention will be described.

First, a sintered substrate made of alumina titanium carbide ($Al_2O_3$+TiC) or the like, for example, is prepared. Vickers hardness of the substrate is 1600 or more. Identification information is inscribed on the surface of the substrate opposite to the surface on which magnetic thin films are to be formed, that is, the back surface of the substrate, by the laser marking method described above. The depth of the inscribed grooves is controlled in the range between 0.1 $\mu$m and 5 $\mu$m, inclusive.

In order to remove particles (dust) attaching during the inscribing step, the resultant substrate is immersed in pure water (i.e., deionized water) for ultrasonic cleaning. Subsequently, an amorphous aluminum oxide film (thickness: 0.5 $\mu$m to 20 $\mu$m, for example) is deposited on the front surface. of the substrate by sputtering. The surface of the amorphous aluminum oxide film is then smoothed. Thus, the basic stage of the process for fabricating a substrate for a thin film magnetic head is completed.

Figure 1A:
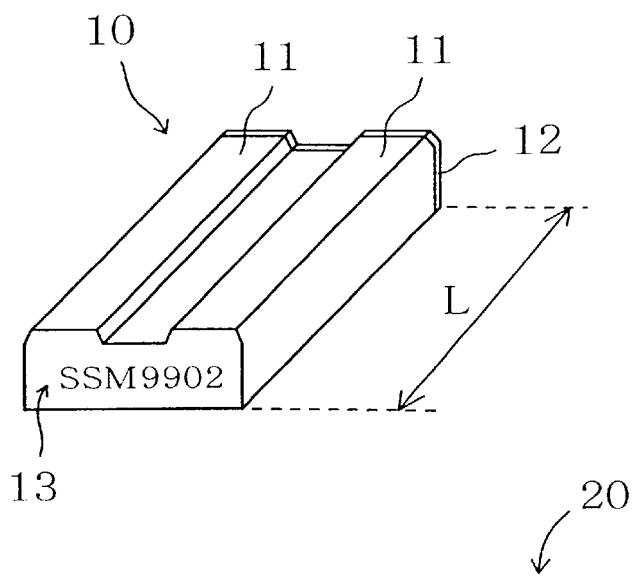
FIG. 1A is a perspective view of a magnetic head slider.
Figure 1B:
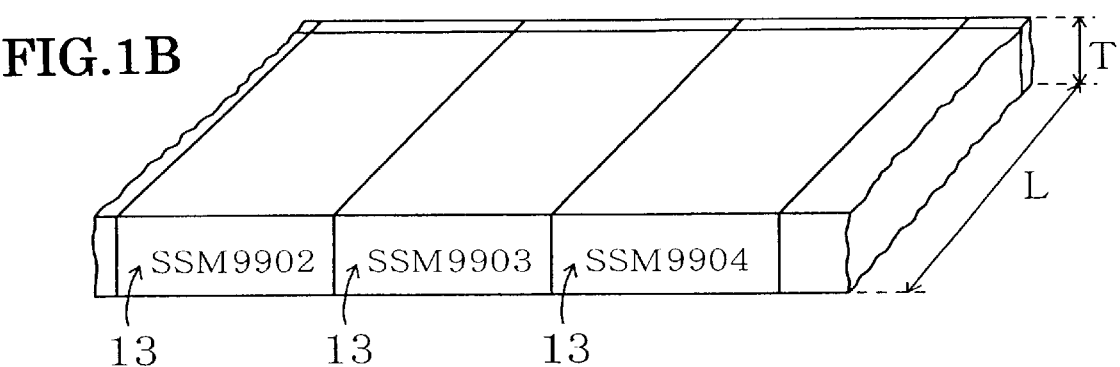
FIG. 1B is a perspective view of a bar from which the magnetic head slider is to be separated.
Figure 1C:
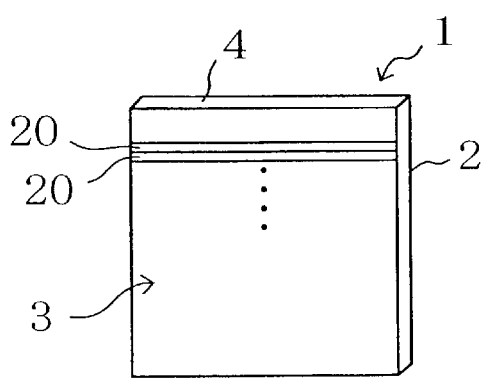
FIG 1C is a perspective view of a rectangular sintered substrate.

Thereafter, various magnetic thin films are formed on the resultant substrate for a thin film magnetic head. The thus-fabricated substrate is divided into a plurality of bars 20 as shown in FIG. 1C. Each of the bars 20 obtained from the substrate has a plurality of marks of identification information 13 as shown in FIG. 1B. Each of the magnetic head sliders obtained from each bar 20 has the identification information 13 unique to the magnetic head slider as shown in FIG. 1A. In this way, the serial number of each magnetic head slider can be easily identified. This makes it possible to perform the process management during fabrication of magnetic heads, as is performed conventionally.

Thus, in this embodiment, a magnetic head having the following advantages can be fabricated. That is, the trouble of contamination generated during the laser marking step is overcome. In addition, the resultant magnetic head can be favorably used for a magnetic storage medium drive that should be protected from dust contamination as strictly as possible. As a result, the production yield of the magnetic heads improves, and the reliability of a magnetic recording/reproducing apparatus provided with the magnetic head improves.

EXAMPLE

In the example of this embodiment, a composite sintered alumina titanium carbide substrate made of 66 wt. % of $Al_2O_3$ and 3 wt. % of TiC was used as the object (sintered product) to be inscribed with laser light. This sintered substrate is a machined, thin rectangular plate (50 mm×50 mm) having a thickness of 1.2 mm with a surface thereof being mirror-finished to have a surface roughness Ra of 0.5 to 1.5 nm using diamond slurry (mean grain diameter: 1 $\mu$m).

In this example, identification information was inscribed by irradiating the back surface of the substrate with laser light having a wavelength of 1,063 nm. In this inscription, a 7-digit code (composed of seven characters and/or numerals) was marked for each head portion. A total of 3,000 codes (21,000 characters and/or numerals) were marked on the back surface of one substrate. The size of each character/numeral engraved was about 100 $\mu$m×150 $\mu$m.

A YAG (Yttrium-Aluminum-Garnet) laser was used as the laser light source. The scanning speed (marking speed) of the laser light for each sample was fixed at 40 nm/sec. The depth of the grooves formed by marking (inscription depth) was controlled by adjusting the optical power of the laser light in the range of 0.1 to 1.0 W. The beam spot diameter of the laser light on the substrate surface was about 10 $\mu$m.

Figure 3A:
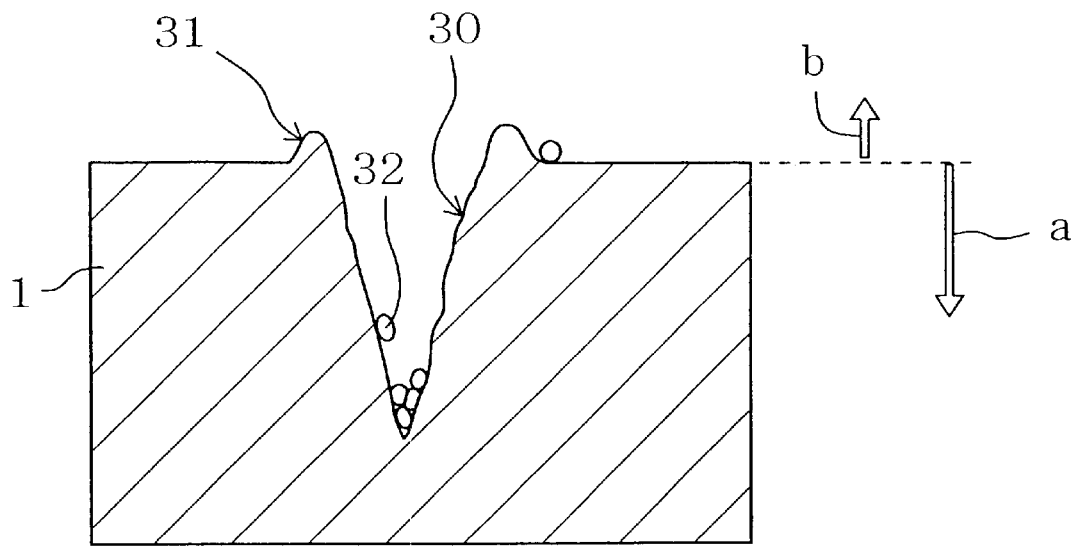
FIG. 3A is a cross-sectional view of an inscribed portion deeply engraved by the conventional laser marking method.
Figure 3B:
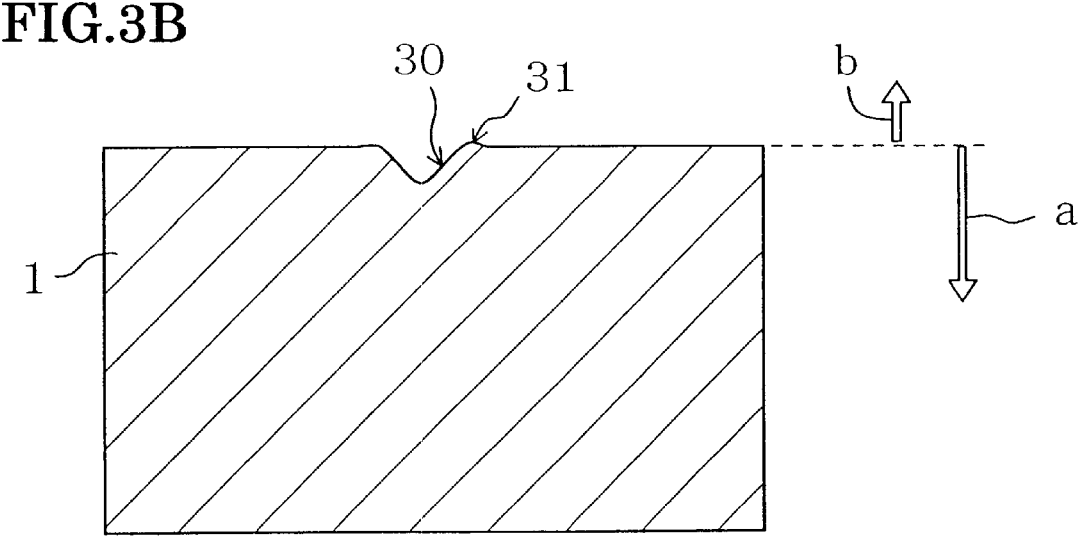
FIG. 3B is a cross-sectional view of an inscribed portion shallowly engraved by a marking method of the present invention.

The portion of the back surface of the alumina titanium carbide substrate irradiated with the laser light was instantaneously heated to a temperature of the melting point or higher, forming a concave portion having a width of several micrometers together with a slightly raised portion surrounding the concave portion. FIG. 3B illustrates in section the portion of the alumina titanium carbide substrate irradiated with the laser light in this example.

The alumina titanium carbide substrate marked under the above conditions of laser light irradiation was then subjected to ultrasonic cleaning with pure water (i.e., deionized water). Thereafter, the number of particles (diameter: 2 $\mu$m or more) left unremoved on the substrate was counted with a liquid particle counter. Also, the height of edge burrs was measured under SEM observation. Further, whether or not the inscribed identification information was visually recognizable was evaluated.

The results of the above experiments are shown in Table 1 below.

TABLE 1

| Inscription depth | Visual evaluation | Edge burr height | Number of particles |
|---|---|---|---|
| 30 $\mu$m | Recognizable | 2.3 $\mu$m | 489652 |
| 10 $\mu$m | Recognizable | 1.5 $\mu$m | 264371 |
| 5 $\mu$m | Recognizable | 0.2 $\mu$m | 8206 |
| 3 $\mu$m | Recognizable | 0.2 $\mu$m | 8004 |
| 1 $\mu$m | Recognizable | 0.1 $\mu$m | 6123 |
| 0.5 $\mu$m | Recognizable | <0.01 $\mu$m | 6234 |
| 0.1 $\mu$m | Recognizable | <0.01 $\mu$m | 5261 |
| 0.05 $\mu$m | Not recognizable | <0.01 $\mu$m | 5014 |

The "number of particles" in Table 1 refers to the number of particles detected in 100 ml of pure water. The inscription depth of 0.05 to 30 $\mu$m corresponds to the laser light power of 0.1 to 1.0 W. The relationship between the "number of particles" and the "inscription depth" is shown in the form of a graph in FIG. 4 for the sake of clarity.

Figure 4:
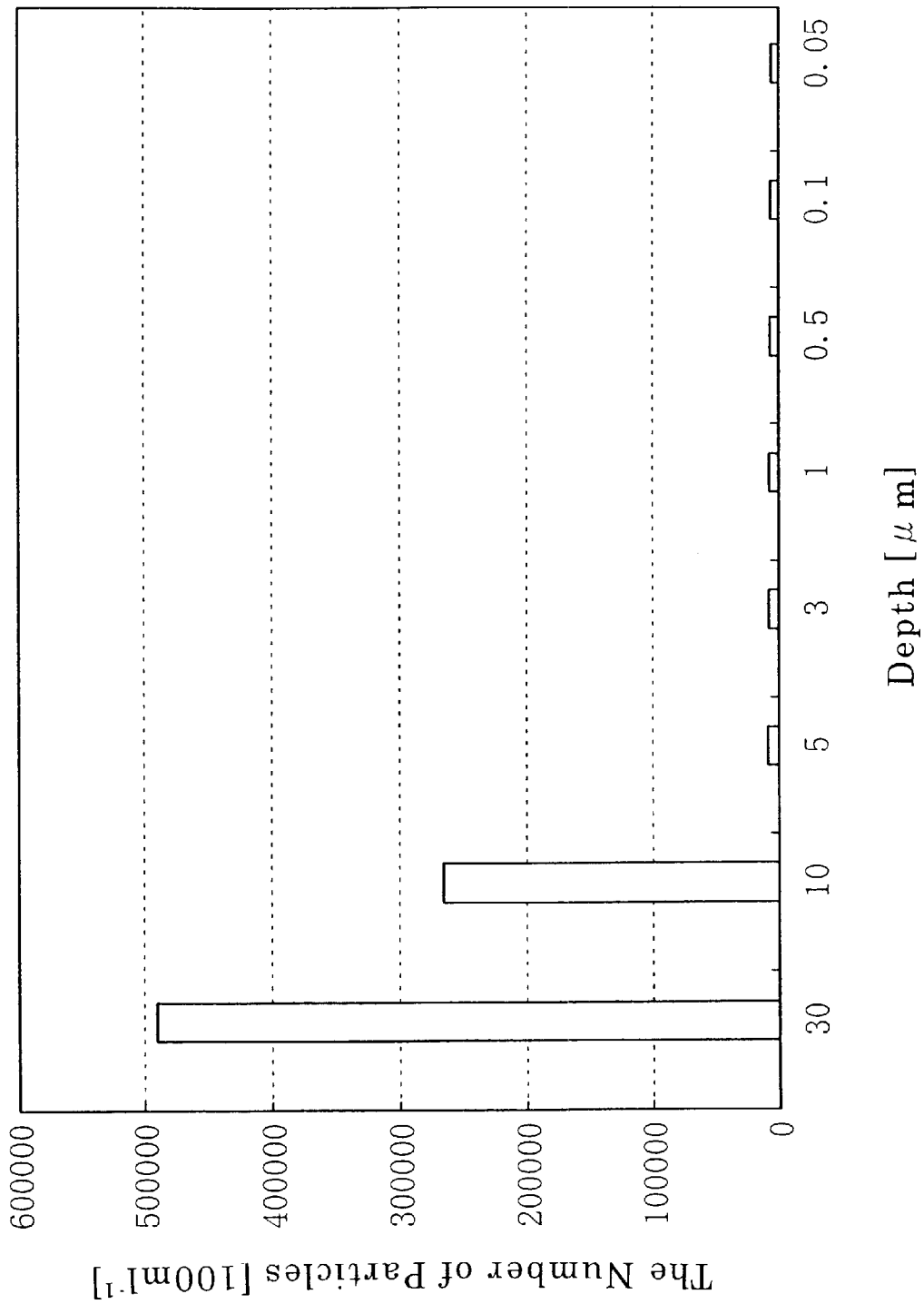
FIG. 4 is a graph showing the relationship between the inscription depth by laser marking and the number of particles.

As is apparent from Table 1 and FIG. 4, as the inscription depth is larger, the number of particles and the edge burr height increase. In particular, when the inscription depth is 10 $\mu$m or more, the number of particles exceeds 250,000 and the edge burr height reaches 1.5 $\mu$m. On the contrary, when the inscription depth is 5 $\mu$m or less, the number of particles is less than 10,000 and the edge burr height decreases to 0.2 $\mu$m or less.

From the above experiment results, it is found that the inscription depth is preferably 5.0 $\mu$m or less. However, if the inscription depth is 0.05 $\mu$m, the identification information is not recognizable. Therefore, the lower limit of the inscription depth is preferably 0.1 $\mu$m or more. From the standpoint of dust reduction, the inscription depth is preferably 1 $\mu$m or less. From the standpoint of keeping high the readability, the inscription depth is preferably 0.5 $\mu$m or more.

The number of particles when the inscription depth is 10 $\mu$m is greatly different from that when it is 5 $\mu$m. Concretely, the ratio of the former to the latter is about 30:1. However, when the inscription depth is in the range between 0.1 $\mu$m and 5 $\mu$m, inclusive (the range according to the present invention), neither the number of particles nor the edge burr height change so largely. The reason for this is unknown, but it is certain that by only reducing the inscription depth to 5 $\mu$m or less, both the number of particles and the edge burr height can be greatly reduced.

In the conventional laser marking technique, it has been taken for granted that the inscription depth should be 30 $\mu$m or more probably because the highest priority has been given to easy visual recognition. The inventors of the present invention have found that visual recognition is still obtained even if the inscription depth is 5 $\mu$m or less as long as it is within a certain depth range, and, moreover in such a depth range the number of particles and the edge burr height can be greatly reduced beyond expectation. The present invention has been conceived from these findings.

In this embodiment, the sintered product is inscribed by laser light irradiation. This makes it possible to write identification information on the sintered product efficiently in a short time even if the sintered product has an extremely high hardness (Vickers hardness of 2000 or more).

Embodiment 2

If the depth of the engraved concave portion is made too small in order to solve the problem of contamination due to the engraving of the sintered product, it may sometimes be difficult to read identification information such as engraved letters. In general, the identification information is read by irradiating the engraved portion with light and subjecting the light reflected from the engraved portion to image processing to recognize the identification information. The reason why the identification information can be reproduced from the reflected light is that contrast in reflected light is generated between the engraved concave portion and the flat portion (background portion). This contrast is higher as the engraved concave portion is deeper. For this reason, if the engraved concave portion is made shallow in an attempt to reduce contamination due to the engraving, the contrast in reflected light will become so low that the engraved identification information will fail to be correctly recognized by a conventional wafer character recognition system.

Figure 5A:
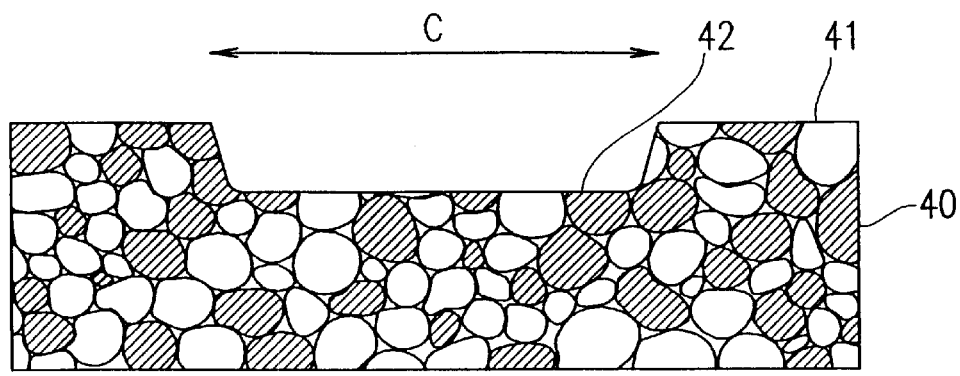
FIG. 5A is a cross-sectional view of an inscribed portion formed by a conventional marking method using non-selective chemical etching.

FIG. 5A illustrates, in section, a concave portion engraved by a conventional etching method. In FIG. 5A, also illustrated in section is a sintered substrate 40 formed of two kinds of powder particles having different etching characteristics. Referring to FIG. 5A, on the surface of the sintered substrate 40, an etched surface 42 has a width indicated by C (width of an inscribed groove). The etched surface 42 is located at a lower level than a non-etched surface 41. A steep step is formed between the non-etched surface 41 and the etched surface 42.

In the conventional etching method, etching proceeds uniformly even when the sintered substrate 40 is formed of two kinds of powder particles having different etching characteristics. As a result, a recessed portion having a substantially flat bottom surface is formed on the sintered substrate 40. This non-selective etching generates no substantial difference in reflectance between the flat portion (non-etched surface 41) and the bottom surface of the recessed, portion (etched surface 42). In this state, the contrast in reflected light depends on the depth of the recessed portion. In order to ensure a contrast required for recognizing the identification information, therefore, it is necessary to form a concave portion having a depth exceeding 200 nm.

Conventionally, the above non-selective etching has been adopted because it is necessary to form a deep concave portion efficiently at a high etching rate. In order to form a deep concave portion at an increased etching rate, the non-selective etching is inevitably adopted.

Figure 5B:
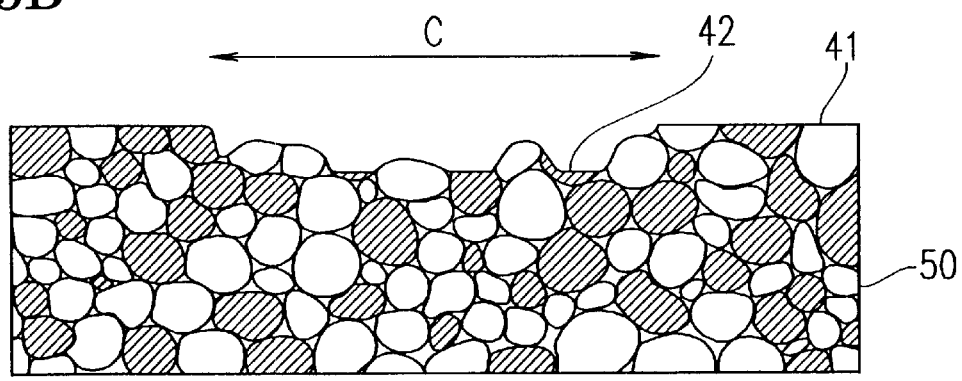
FIG. 5B is a cross-sectional view of an inscribed portion formed by a marking method of the present invention.

FIG. 5B illustrates in section a concave portion or recessed portion formed by a marking method of the present invention. In the example illustrated in FIG. 5B, selective etching is performed for a sintered substrate 50 formed of two kinds of powder particles (grains) having different etching characteristics. As a result of the selective etching, one kind of powder particles having a relatively high etching rate (hatched particles in FIG. 5B) are etched with priority over the other kind of powder particles having a relatively low etching rate (non-hatched particles). As a result, the etched surface 42 has a finer concave/convex profile. The respective concave and convex portions are minute having a size roughly as large as the size of the powder particles. The depth of the recessed portion varies depending on the etching time.

In the selective etching, the etching rate A for the material (particles) etched with priority is preferably higher by 10% or more than the etching rate B for the material (particles) that is relatively not easily etched. In other words, preferably, A/B 1.1. A readable reflectance difference is obtained when A/B 1.07. Herein, therefore, the etching satisfying A/B 1.07 is referred to as "selective etching"

The mean grain diameter of the particles constituting the sintered substrate 50 is in the range between 0.3 µm and 0.5 µm, inclusive, which is small compared with the width C of the concave portion formed by marking (5 to 20 µm). Therefore, the bottom surface of the engraved concave portion (etched surface 42) diffuses light emitted from an identification information reader. This lowers the reflectance of the bottom surface compared with the reflectance of the flat portion (non-etched surface 41).

As described above, this embodiment of the present invention is characterized in that only a material as part of composite materials constituting the sintered substrate 50 is selectively etched, to lower the reflectance of the etched surface 42. By providing a reflectance difference for the surface of the sintered substrate 50, the reflected light has a sufficiently high contrast even if the depth of the concave portion (etching depth) is reduced to the range between 5 nm and 200 nm, inclusive. The reflectance of the surface of the sintered substrate also depends on the wavelength or spectrum of the irradiated light. It is therefore necessary to secure a sufficiently large reflectance difference for the irradiated light actually used by the optical identification information reader. A recognizable contrast can be generated if the reflectance difference is 15% or more.

Marking Method for Sintered Product

First, a sintered substrate produced by a conventional method is prepared. In this embodiment, as the sintered substrate to be marked, used is a sintered product produced using a powder material composed of at least two kinds of particles having different etching characteristics against a specific etchant. As the material for such a sintered substrate, preferred is a ceramic material essentially composed of two or more kinds of compounds selected from the group consisting of aluminum oxide, aluminum nitride, silicon oxide, silicon nitride, zirconium oxide, zirconium nitride, silicon carbide, titanium carbide, titanium oxide, and iron oxide.

An important point in this embodiment is that powder particles used for the production of the sintered substrate exhibit two or more different etching characteristics. For example, compounds having the same composition commonly expressed as $Al_2O_3$ may have greatly different etching characteristics depending on whether or not an impurity such as a rare-earth oxide and an alkaline-earth oxide has been added and, if added, on the concentration of the impurity. It is therefore possible to provide different etching characteristics for first and second powders of which basic compositions are commonly expressed as $Al_2O_3$. Therefore, the marking method of this embodiment is also applicable to a sintered substrate produced from two or more kinds of $Al_2O_3$ powders having different etching characteristics.

A preferred embodiment of the present invention will be described with reference to FIGS. 6A through 6D, using the sintered substrate 50 made of an $Al_2O_3$—TiC ceramic material essentially composed of two kinds of compounds, $Al_2O_3$ and TiC, as an example.

Figure 6A:
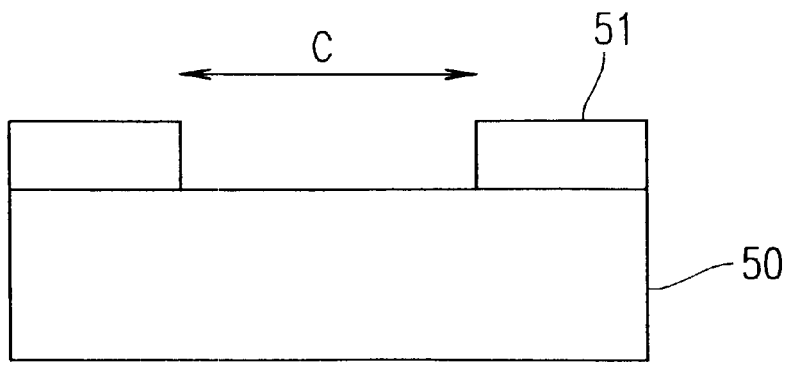
FIGS. 6A, 6B, and 6C are cross-sectional views illustrating the steps of selective etching for marking.

Referring to FIG. 6A, before the selective etching, the area of the surface of the sintered substrate 50, other than the portion to be etched, is masked with a mask layer 51 made of an etching-resistant material. For example, if a positive photoresist for G-line is used as the mask layer 51, the mask layer 51 is formed by applying a positive photoresist for G-line (film thickness: 1 to 2 µm) to the surface of the sintered substrate 50 with a spinner or the like and baking the photoresist. As this type of photoresist material, OFPR-800 of Tokyo Ohka Kogyo Co., Ltd. may be used. After the baking, the photoresist is irradiated with G-line of about 200 mJ/cm$^2$ via a photomask or titler that defines a pattern of identification information (light exposure step). After the light exposure step, the resultant substrate is developed, to form the resist mask 51 having an opening (width C) defining a pattern corresponding to the pattern of identification information on the sintered substrate 50.

The resultant sintered substrate 50 with the resist mask 51 formed thereon is put in a reaction chamber (not shown) of an etching apparatus for the selective etching. This selective etching may be dry etching or wet etching. If dry etching is adopted, it must be reactive etching in order to effect the selective etching. The kind of etching gas as a source of the etchant may be appropriately selected depending on the material to be etched. For the $Al_2O_3$—TiC ceramic substrate, $CF_4$ gas and $SiH_4$ gas can be suitably used.

Figure 6B:
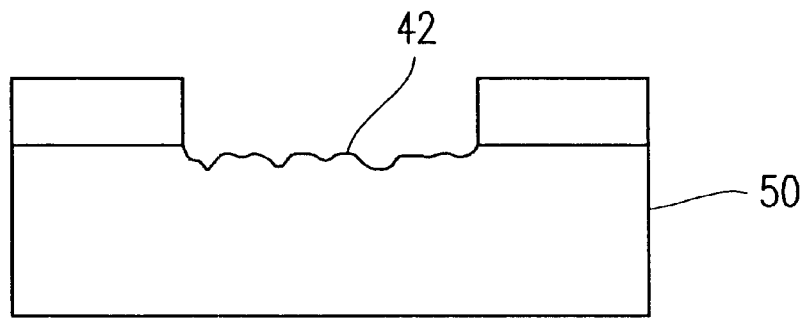

Once the selective etching is finished, the portion of the surface of the sintered substrate 50 that is not covered with the resist mask 51 (etched surface 42) has a fine concave/convex profile as shown in FIG. 6B.

Figure 6C:
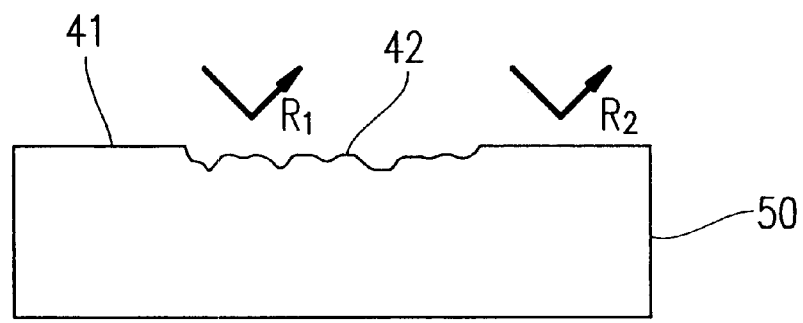
Figure 6D:
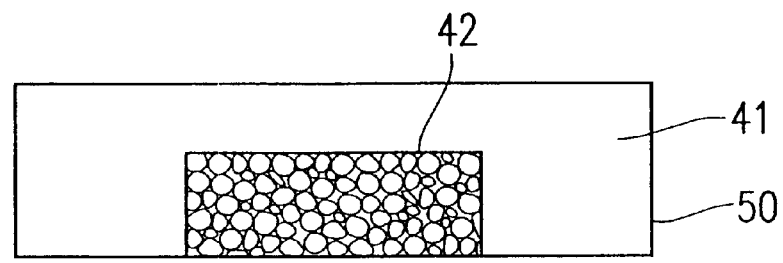
FIG. 6D is a top view illustrating an etched surface and a non-etched surface of a ceramic substrate.

Referring to FIG. 6C, the resist mask 51 is removed from the sintered substrate 50. The reflectance R1 of the etched surface 42 having a fine concave/convex profile is lower than the reflectance R2 of the relatively smooth non-etched surface 41 (R1<R2). FIG. 6D is a plan view schematically illustrating the concave/convex etched surface 42.

The layout of the portion to be etched is defined by the plane pattern of the resist mask 51. The plane pattern of the resist mask 51 is given an arbitrary shape by the photomask or titler used in the light exposure step. In this way, arbitrary identification information in the form of a character, a code, a barcode, or the like can be written on the sintered substrate 50.

In order to reduce the reflectance R1 of the etched surface 42, the line width of an engraved character, code, barcode, or the like is preferably made larger than the mean grain diameter of the particles constituting the sintered substrate 50.

In order to increase the reflectance R2 of the non-etched surface 41, the plane roughness of the surface 41 is preferably lessened to smooth the surface 41. To realize this, it is effective to polish the surface of the sintered substrate 50 before the etching.

As the reflectance variation, that is, the reflectance difference $\Delta R(R2-R1)$ is larger, the contrast is higher in the reflected light from the surface of the sintered substrate 50 that has been irradiated with light. In the example shown in FIG. 6D, the etched surface 42 is observed darker than the other area, which makes it easier to read the identification information such as an engraved character correctly.

As described above, in this embodiment, the contrast is improved by forming the fine concave/convex profile on the etched surface without increasing the etching depth. This minimizes the possibility that the engraved portion may serve as a source of dust particles.

Method for Fabricating Magnetic Head Substrate

An embodiment of the method for fabricating a magnetic head substrate of the present invention will be described.

First, an $Al_2O_3$—TiC ceramic substrate, for example, is prepared. Identification information is inscribed on the surface of the substrate opposite to the surface on which magnetic thin films are to be formed, that is, the back surface of the substrate, by the marking method described above. The depth of the inscribed grooves is controlled in the range between 5 nm and 200 nm, inclusive.

An amorphous aluminum oxide film (thickness: 0.5 to 20 µm, for example) is deposited on the front surface of the substrate The surface of the amorphous aluminum oxide film is then smoothed. Thus, the basic stage of the process for fabricating a substrate for a thin film magnetic head is completed.

Thereafter, various magnetic thin films are formed on the substrate for a thin film magnetic head. The resultant substrate is divided into a plurality of bars 20 as shown in FIG. 1C. Each of the bars 20 obtained from the substrate has a plurality of marks of identification information 13 as shown in FIG. 1B. Each of the magnetic head slider obtained from each bar 20 has the identification information 13 unique to the magnetic head slider as shown in FIG. 1A. In this way, the serial number of each magnetic head slider can be easily identified. This makes it possible to perform the process management during production of magnetic heads as is performed conventionally.

In this embodiment, a magnetic head having the following advantages can be fabricated. That is, the problem of contamination generated during the marking step, is overcome. In addition, the magnetic head can be favorably used for a storage disc drive that should be protected from dust contamination as strictly as possible. As a result, the production yield of the magnetic heads improves, and the reliability of the magnetic recording/reproducing apparatus provided with the magnetic head improves.

Which portion of the magnetic head should be subjected to the marking can be determined arbitrarily. As for the portion to be marked, the present invention is not limited to the marked positions indicated in this embodiment.

Data Storage Disc Drive

Figure 7:
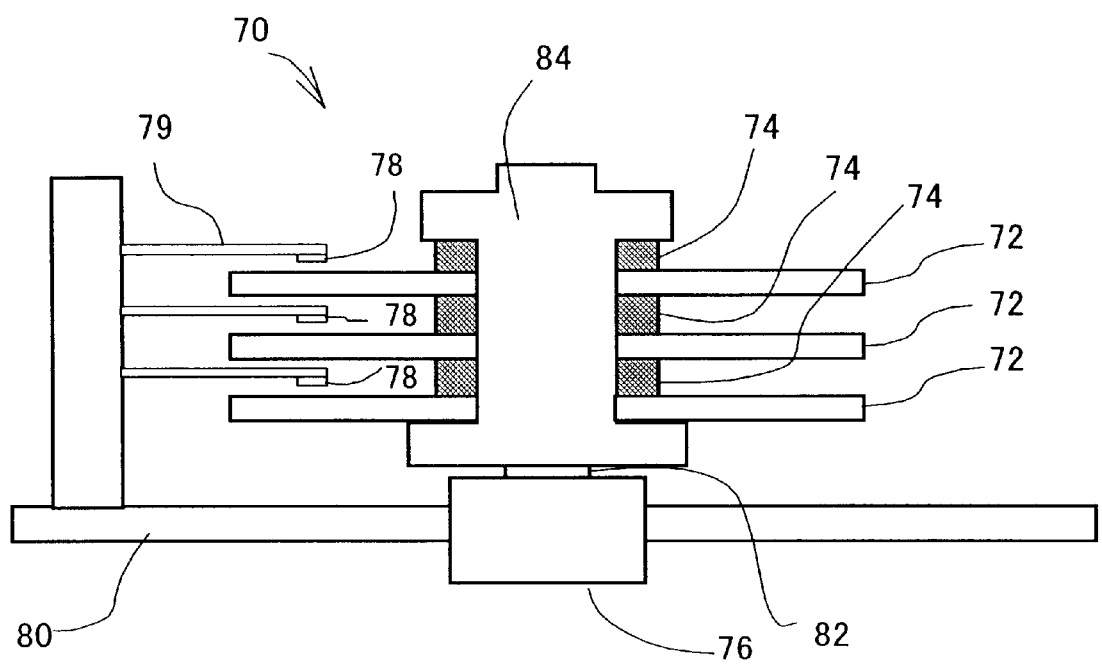
FIG. 7 is a cross-sectional view of a storage medium drive of the present invention.

FIG. 7 illustrates a cross-sectional structure of a data storage disc device (hard disk drive) 70 provided with magnetic heads with identification information written by the above-described marking method of the present invention.

The illustrated drive 70 includes three magnetic disks 72 having a magnetic recording layer (not shown), medium spacers 74 inserted between the magnetic disks 72, an electric motor 76 for rotating the magnetic disks 72, magnetic heads 78 that come close to the magnetic disks 72 for effecting recording/reproduction of data. The magnetic heads 78 are those fabricated by the method described above, where identification information is engraved on the surface thereof. Each of the magnetic heads 78 is fixed to the top end of a support member 79 so as to be accessible to an arbitrary track on the rotating magnetic disk 72. An electric/magnetic transducer element (not shown) provided on each magnetic head 78 executes read/write of data on/from the magnetic recording layer (not shown) of the magnetic disk 72. The electric motor 76 is fixed to a chassis 80 of the hard disk drive 70. A rotation column 84 is mounted on the electric motor 76, so as to rotate the magnetic disks 72 together with the rotation column 84.

EXAMPLES

In the examples of this embodiment, a composite sintered $Al_2O_3$—TiC ceramic substrate made of 66 wt. % of $Al_2O_3$ and 34 wt. % of TiC was used. This substrate is a machined rectangular thin plate (50 mm×50 mm) having a thickness of 1.2 mm with a surface thereof being mirror-finished to have a surface roughness Ra of 0.5 to 1.5 nm using diamond slurry (mean grain diameter: 1 µm).

In the examples, identification information was inscribed on the back surface of the substrate by etching the back surface under various conditions. In this inscription, a 7-digit code (composed of seven characters and/or numerals) was marked for each head portion of the substrate. The identification information is not limited to a code, but a two-dimensional barcode may be marked. The detailed conditions of the etching are shown in Table 2 below.

A total of 3,000 codes (21,000 characters and/or numerals) were marked on the surface of one substrate. The size of each character/numeral engraved was about 100×150 μm.

TABLE 2

| Example | Method | Etching Depth (nm) | Reflectance Variation (%) | LPC Evaluation (pcs./100 cc) | Readout rate (%) |
|---|---|---|---|---|---|
| 1 | ICP-RIE($CF_4$) | 70.2 | 22.25 | 3,578 | 96.5 |
| 2 | ICP-RIE($CF_4$) | 33.6 | 23.75 | 3,879 | 99.4 |
| 3 | ICP-RIE($CF_4$) | 180.5 | 34.67 | 3,634 | 99.5 |
| 4 | Cnv.RIE($CF_4$) | 69.4 | 65.63 | 8,956 | 99.6 |
| 5 | Cnv.RIE($CF_4$) | 37.5 | 46.25 | 6,765 | 99.2 |
| 6 | Cnv.RIE($CF_4$) | 8.5 | 15.46 | 4,897 | 97.4 |
| 7 | Wet etch($HNO_3$) | 10.6 | 25.84 | 4,289 | 99.6 |

In Table 2, "ICP-RIE" stands for "inductively coupled plasma—reactive ion etching", "Cnv.RIE" stands for "conventional reactive ion etching", and "LPC" stands for "liquid particle counter". The "etching depth" represents the mean depth of the etched surface having a fine concave/convex profile. The "reflectance variation" represents the reflectance difference $\Delta R = R2 - R1$ for the light having a wavelength of 564 nm. The "LPC evaluation" represents the number of particles existing in water in which the ceramic substrate has been immersed after the etching, as measured with a particle counter (the number of particles per 100 cc of water). The "readout rate" represents the value measured with a reader using the light having a wavelength of 564 nm as irradiated light. Instead of using this light, white light or other visible light can be used for readout. As such a reader, "acuReader" of Komatsu Ltd., for example, may be used.

For selective etching, a parallel plate type plasma etching apparatus provided with a magnetic field generation coil was used in Examples 1 to 3, while a parallel plate type plasma etching apparatus involving no magnetic field application was used in Examples 4 to 6. In these etching apparatus, an electrode on the substrate holder side thereof is connected to a radio-frequency (RF) source, so that etching gas plasma is generated between upper and lower electrodes. In Example 7, the ceramic substrate was immersed in an $HNO_3$ solution for selective etching.

In general, the ICP-RIE method can provide a high etching rate compared with the Cnv.RIE method because the former can attain a higher density of electrons in the plasma. While the etching rates in Examples 1 to 3 were in the range of 15 to 25 nm/min, the etching rates in Examples 4 to 6 were in the range of 1 to 5 nm/min.

The selective etching was possible by adjusting the RF power, the gas pressure, the gas flow, and the like. For example, the etching conditions in Example 2 were as follows:

RF power: 300 W, ICP power (power supplied to the magnetic field generation coil): 550 W, Gas used: $CF_4$, Gas pressure: 6 m Torr, Gas flow: 40 sccm, Etching rate: 16.8 nm/min., Etching time: 2 minutes.

Under the above conditions, selective etching as shown in FIG. 5B was successfully performed. The etching conditions in Example 4 were as follows:

RF power: 300 W, Gas used: $CF_4$, Gas pressure: 4 m Torr, Gas flow: 40 sccm, Etching rate: 1.7 nm/min, Etching time: 40 minutes.

Under the above conditions, also, selective etching as shown in FIG. 5B was performed.

Figure 8:
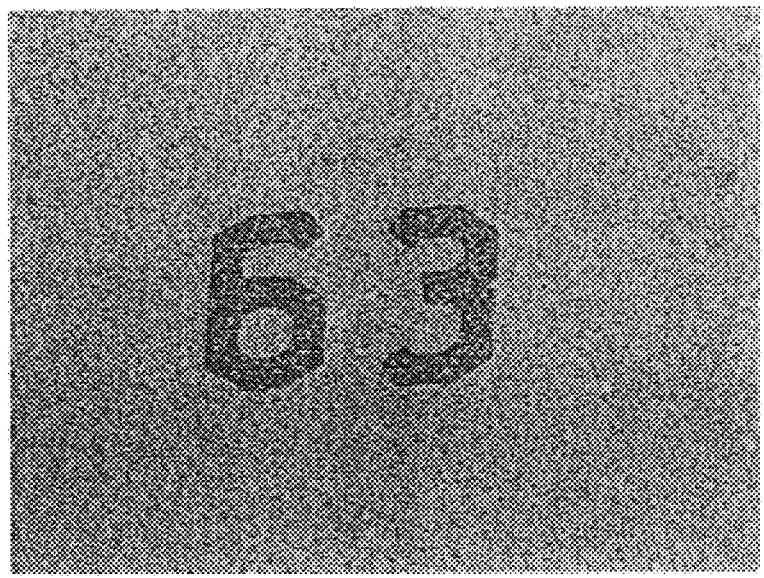
FIG. 8 is an SEM photograph of a marking pattern in Example 2.
Figure 9:
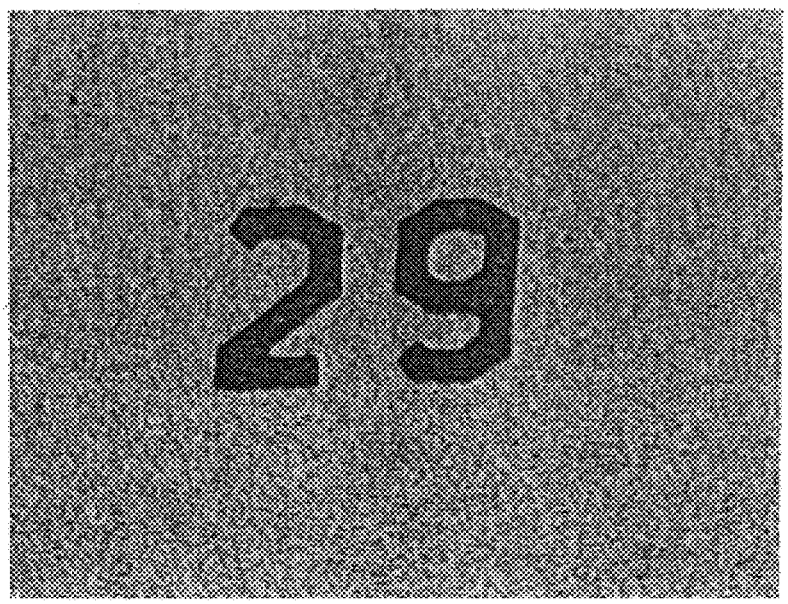
FIG. 9 is an SEM photograph of a marking pattern in Example 4.

FIGS. 8 and 9 are SEM photographs of marking patterns obtained in Examples 2 and 4, respectively. As is apparent from these photographs, the etched portions are darker than the other portions, exhibiting an image with clear contrast.

Reading of the identification information is possible if the reflection variation ΔR for selective etching is 15% or more. From the standpoint of obtaining an improved readout rate, the reflection variation A R for selective etching is preferably 20% or more.

If the etching depth is in the range between 5 nm and 200 nm, inclusive, both the readout rate and the LPC evaluation are in the practically usable levels. If further improvement in these properties is desired, the etching depth is preferably set in the range between 10 nm and 100 nm, inclusive.

Comparative Examples

As comparative examples, non-selective etching was performed, in place of the selective etching in the above examples, employing various methods shown in Table 3 below for the same substrates as those used in the above examples.

TABLE 3

| Comp. | Method | Etching Depth (nm) | Reflectance Variation (%) | LPC Evaluation (pcs./100 cc) | Readout rate (%) |
|---|---|---|---|---|---|
| 1 | IBE (Ar) | 62.5 | 1.25 | 2,879 | 35.0 |
| 2 | IBE (Ar) | 25.3 | 0.00 | 3,178 | 5.0 |
| 3 | ICP-RIE($CF_4$) | 353.8 | 35.87 | 24,587 | 99.6 |
| 4 | ICP-RIE($CF_4$) | 1.3 | 1.25 | 2,892 | 2.0 |
| 5 | ICP-RIE($CF_4$) | 7.5 | 13.78 | 2,753 | 75.0 |

In Table 3, "IBE" stands for "ion beam etching".

It is found in comparison with the examples shown in Table 2 that the sample exhibiting a high readout rate has a large number of particles, and that the sample having a small number of particles exhibits a low readout rate. In the ion beam etching employed in the comparative examples, the etching rate $A_1$ of $Al_2O_3$ and the etching rate $B_1$ of TiC have the relationship of $1.0 \leq A_1/B_1 < 1.07$. This etching is therefore not the "selective etching".

Figure 10:
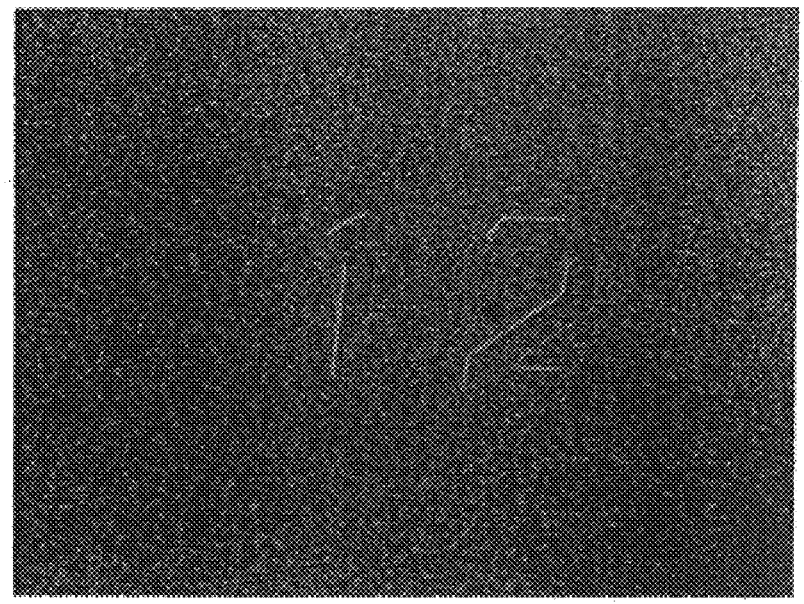
FIG. 10 is an SEM photograph of a marking pattern in Comparative Example 1.
Figure 11:
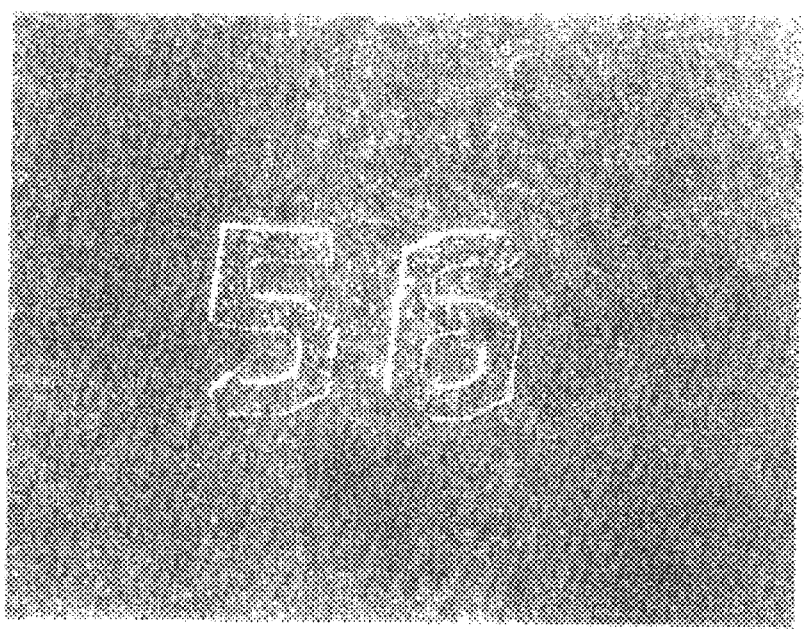
FIG. 11 is an SEM photograph of a marking pattern in Comparative Example 5.

FIGS. 10 and 11 are SEM photographs of marking patterns obtained in Comparative Examples 1 and 5, respectively. In these comparative examples, a sufficient reflectance difference fails to be established between the etched portion and the non-etched portion. The etching conditions in Comparative Example 1 were as follows:

Accelerating voltage: 500 V, Gas used: Ar, Gas pressure: 0.1 m Torr, Beam incident angle: 45°, Etching rate: 10 nm/min, Etching time: 6.5 minutes.

The etching conditions in Comparative Example 5 were as follows:

RF power: 300 W, ICP power: 550 W, Gas used: $CF_4$, Gas pressure: 6 m Torr, Gas flow: 20 sccm, Etching rate: 15 nm/min, Etching time: 0.5 minute.

In Comparative Example 5, although the same etching apparatus and the same gas were used as those used in Example 2, the readout rate significantly lowered. The reason is presumably that due to the reduced gas flow the selective etching was incomplete in Comparative Example 5, thereby reducing the difference in etching rate between $Al_2O_3$ and TiC.

Thus, according to the marking method of one embodiment of the present invention, the inscription depth in laser marking is adjusted in the range between 0.1 μm and 5 μm, inclusive. This markedly reduces the number of dust particles generated and also minimizes formation of edge burrs. By reducing the number of dust particles generated due to the laser marking, inclusion of dust particles in a thin film can be prevented when the thin film is formed on a surface of the sintered product after the laser marking. As a result, a high-quality thin film with reduced contamination can be formed on the surface of the sintered product with high yield. The present invention is therefore suitably applicable to a thin film magnetic head substrate. In addition, by minimizing formation of edge burrs, the step of removing edge burrs after the laser marking can be simplified. It is essential to smooth the inscribed surface when a sintered product is used, as the magnetic head substrate. According to the present invention, however, the smoothing step may even be eliminated, which will greatly contribute to improvement in productivity.

According to the marking method of another embodiment of the present invention, a contrast in reflection light sufficient for recognizing the identification information is secured even if the recessed portion formed by marking is shallow. This significantly reduces the number of dust particles generated from the marked portion without lowering the recognition ratio of the identification information. By reducing the number of dust particles generated due to the marking, inclusion of dust particles in a thin film can be prevented when the thin film is formed on the surface of the sintered product after the marking. As a result, a high-quality thin film with reduced contamination can be formed on the surface of the sintered product with high yield. The present invention is therefore suitably applicable to a magnetic head substrate. In addition, since this method is evaded from formation of edge burrs that are likely to be formed by laser marking, the step of removing edge burrs after the marking can be simplified. It is essential to smooth the inscribed surface when a sintered product is used as the magnetic head substrate. According to the present invention, however, the smoothing step may even be eliminated, which will greatly contribute to improvement in productivity.

According to the present invention, generation of dust from the magnetic head as a complete final component is also reduced. This improves the reliability of the storage disc drive provided with the magnetic head.

While the present invention has been described in a preferred embodiment, it will be apparent to those skilled in the art that the disclosed invention may be modified in numerous ways and may assume many embodiments other than that specifically set out and described above. Accordingly, it is intended by the appended claims to cover all modifications of the invention that fall within the true spirit and scope of the invention.

What is claimed is:

1. A marking method for a sintered product, comprising the steps of:

preparing a sintered product formed of a powder mixture including first powder particles of a first material and second powder particles of a second material having an etching characteristic different from an etching characteristic of the first material; and performing selective etching for a selected portion of a surface of the sintered product, the selective etching including etching the first powder particles with priority over the second powder particles, thereby to write identification information on the surface of the sintered product.

2. A marking method according to claim 1, wherein the mean grain diameters of the first powder particles and the second powder particles are in a range between 0.3 μm and 5.0 μm, inclusive.

3. A marking method according to claim 1, wherein the difference in reflectance between the portion of the surface of the sintered product that has been subjected to the selective etching and a portion that has not been subjected to the selective etching is 15% or more for light having a certain wavelength.

4. A marking method according to claim 3, wherein the wavelength is included in a wavelength range for light used for irradiating the sintered product for optically reading the identification information.

5. A marking method according to claim 1, wherein the plane roughness of the portion of the surface of the sintered product that has not been subjected to the selective etching is 5 nm or less.

6. A marking method according to claim 1, wherein the mean etching depth of the portion of the surface of the sintered product that has been subjected to the selective etching is in a range between 5 nm and 200 nm, inclusive.

7. A marking method according to claim 1, wherein the first material and the second material are compounds selected from the group consisting of aluminum oxide, aluminum nitride, silicon oxide, silicon nitride, zirconium oxide, zirconium nitride, silicon carbide, titanium carbide, titanium oxide, and iron oxide.

8. A method for fabricating a magnetic head substrate made of a sintered product, comprising the steps of:

preparing a sintered product formed of a powder mixture including first powder particles of a first material and second powder particles of a second material having an etching characteristic different from an etching characteristic of the first material; and performing selective etching for a selected portion of a surface of the sintered product, the selective etching including etching the first powder particles with priority over the second power particles, thereby to write identification information on the surface of the sintered product.

9. A method for fabricating a magnetic head, comprising the steps of:

preparing a sintered product formed of a powder mixture including first powder particles of a first material and second powder particles of a second material having an etching characteristic different from an etching characteristic of the first material;

performing selective etching for a selected portion of a surface of the sintered product, the selective etching including etching the first powder particles with priority over the second power particles, thereby to write identification information on the surface of the sintered product; and fabricating a magnetic head from the sintered product.

10. A sintered product formed of a powder mixture including first powder particles of a first material and second powder particles of a second material having an etching characteristic different from an etching characteristic of the first material, wherein the first powder particles are selectively etched with priority over the second power particles in a selected portion of a surface of the sintered product, thereby to write identification information on the surface of the sintered product.

11. A sintered product according to claim 10, wherein the mean grain diameters of the first powder particles and the second powder particles are in a range between 0.3 µm and 5.0 µm, inclusive.

12. A sintered product according to claim 10, wherein the difference in reflectance between the portion of the surface of the sintered product that has been etched and a portion that has not been etched is 15% or more for light having a certain wavelength.

13. A sintered product according to claim 12, wherein the wavelength is included in a wavelength range for light used for irradiating the sintered product for optically reading the identification information.

14. A sintered product according to claim 10, wherein the plane roughness of the portion of the surface of the sintered product that has not been etched is 5 nm or less.

15. A sintered product according to claim 10, wherein the mean etching depth of the portion of the surface of the sintered product that has been etched is in a range of 5 nm and 200 nm, inclusive.

16. A sintered product according to claim 10, wherein the first material and the second material are compounds selected from the group consisting of aluminum oxide, aluminum nitride, silicon oxide, silicon nitride, zirconium oxide, zirconium nitride, silicon carbide, titanium carbide, titanium oxide, and iron oxide.

17. A magnetic head substrate formed of a sintered product made of a powder mixture including first powder particles of a first material and second powder particles of a second material having an etching characteristic different from an etching characteristic of the first material, wherein the first powder particles are selectively etched with priority over the second power particles in a selected portion of a surface of the sintered product, thereby to write identification information on the surface of the sintered product.

18. A magnetic head comprising:

a magnetic head substrate formed of a sintered product made of a powder mixture including first powder particles of a first material and second powder particles of a second material having an etching characteristic different from an etching to characteristic of the first material, the first powder particles being selectively etched with priority over the second power particles in a selected portion of a surface of the sintered product, thereby to write identification information on the surface of the sintered product; and an electric/magnetic transducer element formed on the magnetic head substrate.

19. A storage medium drive comprising:

a magnetic head substrate formed of a sintered product made of a powder mixture including first powder particles of a first material and second powder particles of a second material having an etching characteristic different from an etching characteristic of the first material, the first powder particles being selectively etched with priority over the second power particles in a selected portion of a surface of the sintered product, thereby to write identification information on the surface of the sintered product;

an electric/magnetic transducer element formed on the magnetic head substrate;

a storage medium having a magnetic recording film on/from which information is recorded/reproduced via the magnetic head; and a motor for driving the storage medium.

* * * * *